Patented Feb. 26, 1929.

1,703,129

UNITED STATES PATENT OFFICE.

HERMANN WEYLAND AND STANISLAUS DEICHSEL, OF ELBERFELD, GERMANY, ASSIGNORS, BY MESNE ASSIGNMENTS, TO WINTHROP CHEMICAL COMPANY, INC., OF NEW YORK, N. Y., A CORPORATION OF NEW YORK.

MANUFACTURE OF FATTY ACIDS.

No Drawing. Application filed April 4, 1925, Serial No. 20,852, and in Germany April 11, 1924.

Our invention relates to the manufacture and production of edible fats derived from fatty acids having an odd number of carbon atoms. They are obtained by converting the acids which are contained in the fraction of raw cocinic acids or palm oil fatty acids boiling under a pressure of 10 mm. at a temperature of about 163–180° C. into their methyl ketones, treating the ketones with an oxidizing agent and converting the resulting mixtures of fatty acids in the usual way into their glycol and glycerin esters.

The resulting products have proved to be a useful food for human beings sufferings from diabetes.

Example.

Raw cocinic acids, (cocoa nut oil) are distilled in vacuo i. e. (under a pressure of 10 mm.) and the fraction boiling from 163 to 180° C. is separated. 100 parts by weight of this fraction are mixed with 150 parts by weight of glacial acetic acid and led at 450° over pumice stone impregnated with thorium oxide, $CO_2$ and $H_2O$ being disengaged. A mixture of methyl ketones is obtained which is distilled in vacuo under a pressure of 15 mm. The fraction boiling from 130–160° is a mixture of methyl-undecyl- and methyl-tridecyl-ketone.

50 parts by weight of this mixture is treated with a mixture of 100 parts by weight of sodium bichromate, 300 parts by weight of sulfuric acid and 300 parts by weight of water at about 100° C. The reactions occur according to the following equations (in which the subscript "a" represents the numeral 9 or 11) :—

(1.) $CH_3.(CH_2)_n CH_2.COOH + CH_3COOH = CH_3.(CH_2)_n CH_2.COCH_3 + CO_2 + H_2O$
(2.) $CH_3.(CH_{2a})CH_2.CO.CH_3 + NaHCr_2O_7 + 4H_2SO_4 = CH_3.(CH_2)_n COOH + CH_3.COOH + NaHSO_4 + Cr_2(SO_4)_3 + 4H_2O$

Thus for example

1. $CH_3.(CH_2)_9.CH_2.COOH + CH_3COOH = CH_3.(CH_2)_9.CH_2.CO.CH_3 + CO_2 + H_2O$
2. $CH_3.(CH_2)_9.CH_2.CO.CH_3 + NaHCr_2O_7 + 4H_2SO_4 = CH_3.(CH_2)_9.COOH + CH_3.COOH + NaHSO_4 + Cr_2(SO_4)_3 + 4H_2O$

The acetic acid is driven off with steam and the raw mixture is purified and distilled in vacuo. The fraction boiling at 140–170° C. under a pressure of 10 mm. being for the greatest part undecyl and tridecyl acid is esterified with glycerine. The ester is made neutral and distilled over with steam in vacuo. The resulting fat is odorless and tasteless. It melts at about 25° C. and is a mixture of triundecyl and tridecyl glyceride.

In an analogous way the other fats are obtained e. g. from palm oil fatty acids, etc. From palm oil fatty acids the triundecyl acid glyceride results.

We wish it to be understood that in the process claimed hereinafter one may use as starting material instead of the fraction of raw cocinic acids, the corresponding fraction of palm oil acids.

We claim :—

1. The process which consists in converting into their methyl-ketones the fatty acids contained in the fraction of the raw cocinic acids boiling under a pressure of 10 mm. at a temperature of about 163–180° C., treating the ketones thus obtained with an oxidizing agent and converting the resulting mixtures into the polybasic alcohol esters.

2. The product which is obtainable by converting into their methyl-ketones the fatty acids contained in the fraction of the raw cocinic acids boiling under a pressure of 10 mm. at a temperature of about 163–180° C., treating the ketones thus obtained with an oxidizing agent and converting the resulting mixture into the polybasic alcohol esters.

In testimony whereof we have hereunto set our hands.

HERMANN WEYLAND.
STANISLAUS DEICHSEL.